United States Patent
Wang et al.

(10) Patent No.: US 12,112,907 B2
(45) Date of Patent: Oct. 8, 2024

(54) OPTICAL PATH SYSTEM FOR DETECTING VACUUM DEGREE OF VACUUM SWITCH AND METHOD THEREOF

(71) Applicant: XI'AN JIAOTONG UNIVERSITY, Shaanxi (CN)

(72) Inventors: Xiaohua Wang, Shaanxi (CN); Wei Ke, Shaanxi (CN); Aijun Yang, Shaanxi (CN); Huan Yuan, Shaanxi (CN); Dingxin Liu, Shaanxi (CN); Mingzhe Rong, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 303 days.

(21) Appl. No.: 17/864,042

(22) Filed: Jul. 13, 2022

(65) Prior Publication Data
US 2023/0178316 A1   Jun. 8, 2023

(30) Foreign Application Priority Data
Dec. 6, 2021   (CN) .......................... 202111512669.5

(51) Int. Cl.
| | |
|---|---|
| *H01H 33/668* | (2006.01) |
| *G01N 21/71* | (2006.01) |
| *H01H 33/662* | (2006.01) |
| *H01S 3/097* | (2006.01) |

(52) U.S. Cl.
CPC ......... *H01H 33/668* (2013.01); *G01N 21/718* (2013.01); *H01H 33/66207* (2013.01); *H01S 3/097* (2013.01)

(58) Field of Classification Search
CPC ........... H01H 33/668; H01H 33/66207; G01N 21/718; H01S 3/097
See application file for complete search history.

(56) References Cited

U.S. PATENT DOCUMENTS

| | | | |
|---|---|---|---|
| 10,520,437 B1 * | 12/2019 | Stebbins | ................ G02B 21/16 |
| 2003/0174325 A1 * | 9/2003 | Zhang | .................. G01N 21/718 |
| | | | 356/318 |

FOREIGN PATENT DOCUMENTS

| | | | |
|---|---|---|---|
| CN | 105575725 A | * | 5/2016 |
| CN | 105067568 B | * | 10/2017 |

OTHER PUBLICATIONS

CN105067568B_Translation (Year: 2017).*
CN105575725A_Translation (Year: 2016).*

* cited by examiner

*Primary Examiner* — Tarifur R Chowdhury
*Assistant Examiner* — Carlos Perez-Guzman

(57) ABSTRACT

The disclosure discloses an optical path system for detecting a vacuum degree of a vacuum switch and a method thereof. In the optical path system, a plasma excitation unit excites pulsed laser along an excitation optical path to bombard a shielding case of a vacuum switch to be detected, so as to generate laser plasma; an optical path focusing unit focuses the excitation optical path and a collection optical path to focus the pulsed laser on the shielding case of the vacuum switch to be detected; the optical path focusing unit includes a visible laser device for generating visible light and an adjustment device for adjusting the excitation optical path; an image collection unit collects a laser plasma image and a visible light spot focusing image; the image collection unit includes a gated detector for collecting the visible light spot image and the laser plasma image via the collection optical path.

17 Claims, 3 Drawing Sheets

OPTICAL PATH SYSTEM FOR DETECTING VACUUM DEGREE OF VACUUM SWITCH AND METHOD THEREOF

CROSS-REFERENCE TO RELATED APPLICATION

This application claims priority from the Chinese patent application 2021115126695 filed Dec. 6, 2021, the content of which is incorporated herein in the entirety by reference.

TECHNICAL FIELD

The present disclosure belongs to the field of detection of vacuum switches, more particular to an optical path system for detecting a vacuum degree of a vacuum switch and a method thereof.

BACKGROUND

A vacuum switch is a switchgear that uses vacuum as an insulating medium, and the insulation performance thereof depends on a vacuum degree of its core component, i.e., a vacuum arc extinguishing chamber. Although the vacuum switch has been developed for more than 50 years, the online monitoring for the vacuum degree of the vacuum switch is still an international problem, and the existing technical means cannot achieve reliable online monitoring. The vacuum arc extinguishing chamber is a core component of the vacuum switch, and the internal air pressure (vacuum degree) of the vacuum arc extinguishing chamber determines whether a circuit can be connected and disconnected reliably. With the prolonging of the service life and the aging of equipment, the internal vacuum degree of the vacuum arc extinguishing chamber will gradually decrease, and the decrease of the vacuum degree will greatly lower the arc extinguishing ability of the vacuum arc extinguishing chamber. Once the vacuum degree exceeds a certain threshold, the on/off capacity of the vacuum switch will be directly affected, and in severe cases, the vacuum switch will lose its breaking capacity, which brings serious breaking capacity to a power system.

At present, online detection methods for vacuum switches mainly include a shielding case potential method, a partial discharge method and derivative methods thereof, as well as a built-in sensor method. However, the shielding case potential method and the partial discharge method have higher limits of detection, both of which are greater than 1 Pa, which cannot meet actual requirements for online detection of vacuum switches. In the built-in sensor method, the existing vacuum switch structure needs to be modified, and meanwhile, the problem of the compatibility between a high level during switch operation and a low level during sensor operation also needs to be considered. The existing vacuum degree detection technology cannot realize reliable online detection for a vacuum degree of a vacuum switch, which limits the wide application of a green and pollution-free vacuum switch.

The above-mentioned information disclosed in the background is only for enhancing the understanding of the background of the present disclosure, and therefore may contain information that does not form the prior art that is well known to those of ordinary skill in the art in this country.

SUMMARY

For the problems in the prior art, the present disclosure provides an optical path system for detecting a vacuum degree of a vacuum switch and a method thereof.

The purpose of the present disclosure is realized by the following technical solution. An optical path system for detecting a vacuum degree of a vacuum switch includes:

a plasma excitation unit, which excites pulsed laser along an excitation optical path to bombard a shielding case of a vacuum switch to be detected, so as to generate a laser plasma;

an optical path focusing unit, which focuses the excitation optical path and a collection optical path to focus the pulsed laser to the shielding case of the vacuum switch to be detected, and includes a visible laser device for generating visible light and an adjustment device for adjusting the excitation optical path, wherein the visible light forms visible light spots on the shielding case of the vacuum switch to be detected along a visible optical path, the visible optical path at least partially overlaps the excitation optical path, and the collection optical path at least partially overlaps the visible optical path;

an image collection unit, which collects a laser plasma image and a visible light spot focusing image, and includes a gated detector for collecting the visible light spots and the laser plasma image via the collection optical path; and a vacuum degree detection unit, which is connected with the image collection unit to process the laser plasma image and extract characteristic parameters, and includes a processing module for obtaining, according to a relation between the characteristic parameters and the vacuum degree, the vacuum degree of the vacuum switch to be detected.

In the optical path system for detecting the vacuum degree of the vacuum switch, the excitation optical path includes a laser reflector for receiving the pulsed laser, a first long-wave-pass dichroscope, a plano-concave lens, a plano-convex lens, a second long-wave-pass dichroscope, a reflector, and a focusing lens adjacent to the shielding case of the vacuum switch to be detected, which are connected in sequence.

In the optical path system for detecting the vacuum degree of the vacuum switch, the second long-wave-pass dichroscope is a dichroscope with a hole in the middle.

In the optical path system for detecting the vacuum degree of the vacuum switch, the visible optical path includes a first long-wave-pass dichroscope, a concave lens, a convex lens, a second long-wave-pass dichroscope, a reflector, and a focusing lens adjacent to the shielding case of the vacuum switch to be detected, which are connected in sequence.

In the optical path system for detecting the vacuum degree of the vacuum switch, the collection optical path includes a focusing lens adjacent to the shielding case of the vacuum switch to be detected, a reflector, a second long-wave-pass dichroscope, a low-pass filter, and a micro lens adjacent to the gated detector, which are connected in sequence.

In the optical path system for detecting the vacuum degree of the vacuum switch, the optical path system further includes:

a display and input unit, which is connected with the image collection unit and the vacuum degree detection unit to display the laser plasma image, the visible light spot focusing image, and the vacuum degree, and is provided with an input module for inputting system parameters and a control signal; and a signal control unit, which is connected with the optical path focusing unit, the plasma excitation unit, and the display and input unit to control optical path focusing and excitation of the laser plasma.

In the optical path system for detecting the vacuum degree of the vacuum switch, the display and input unit is a touch display screen.

In the optical path system for detecting the vacuum degree of the vacuum switch, the micro lens performs focusing at a pulsed laser focusing point; and a duration between the collection of the plasma image and the excitation of the laser plasma is controlled by an internal response delay of the gated detector.

In the optical path system for detecting the vacuum degree of the vacuum switch, the plasma excitation unit includes a nanosecond pulsed laser and a beam expanding system; and a Q-out signal output by the pulsed laser triggers the gated detector to collect the laser plasma image.

A detection method using the optical path system for detecting the vacuum degree of the vacuum switch includes the following steps:

generating, by the visible laser device, visible light, forming, by the visible light, visible light spots on the shielding case of the vacuum switch to be detected along the visible optical path;

exciting, by the plasma excitation unit, pulsed laser along the excitation optical path to bombard the shielding case of the vacuum switch to be detected, so as to generate a laser plasma;

collecting, by the image collection unit, a laser plasma image and a visible light spot focusing image, focusing, by the optical path focusing unit, the excitation optical path and the collection optical path to focus the pulsed laser on the shielding case of the vacuum switch to be detected, wherein the adjustment device adjusts the excitation optical path; and processing, by the vacuum degree detection unit, the laser plasma image, extracting characteristic parameters, and obtaining, on the basis of a relation between the characteristic parameters and the vacuum degree, the vacuum degree of the vacuum switch to be detected.

Beneficial Effects

In the present disclosure, the vacuum degree is represented on the basis of a laser-induced plasma technology according to plasma characteristics, the practical operation of the vacuum switch is not affected, the vacuum switch does not need to quit an operating state, and real-time online monitoring for the vacuum degree of the vacuum switch can be realized.

In the present disclosure, the high-energy pulsed laser is used to excite the plasma. The laser and plasma light are transmitted through a spatial optical path. The detection device achieves remote contactless detection without contacting the vacuum switch to be detected.

The results of preferred embodiments of the present disclosure show that the limit of detection of the vacuum degree may reach $10^{-4}$ Pa which is less than that of the existing online monitoring method by 4 orders of magnitude.

In the present disclosure, in the plasma exciting process, an ablation crater of the laser has a diameter being less than 300 microns and a depth being less than 40 microns, and thus is hardly affect the vacuum switch in the detection process.

The foregoing description is only a summary of the technical solutions of the present disclosure. The specific embodiments of the present disclosure will be illustrated below to make the technical measures of the present disclosure more clearly to enable those skilled in the art to implement the technical measures in accordance with the content of the specification, and to make the foregoing and other objectives, features and advantages of the present disclosure more understandable.

BRIEF DESCRIPTION OF THE DRAWINGS

By reading the detailed description in the preferred specific embodiments below, various other advantages and benefits of the present disclosure will become clear to those of ordinary skill in the art. The drawings in the description are only used for the purpose of illustrating the preferred embodiments, and are not considered as a limitation to the present disclosure. Obviously, the drawings described below are only some embodiments of the present disclosure. Those of ordinary skill in the art can obtain other drawings based on these drawings without creative work. Furthermore, throughout the drawings, the same reference numerals are used to denote the same components.

In the drawings.

Figure 1:
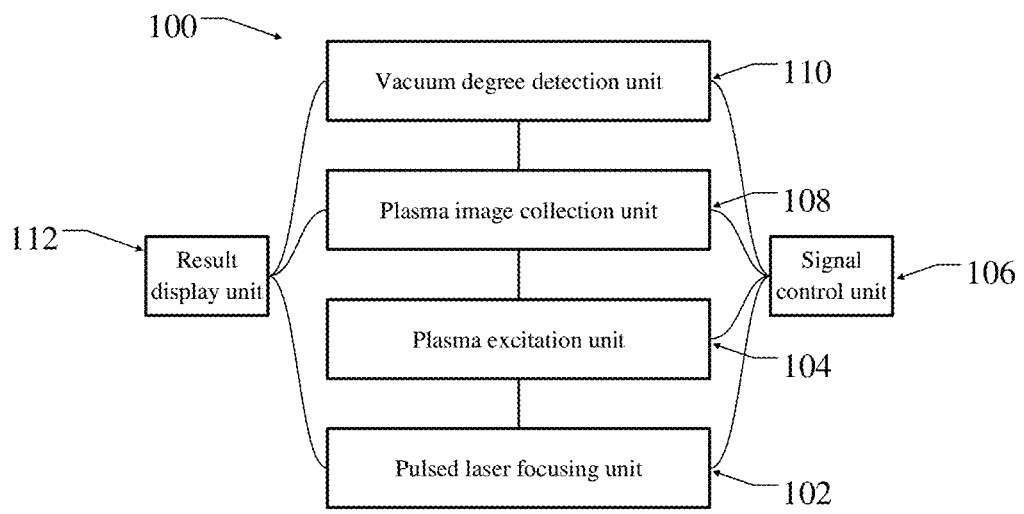
FIG. 1 is a block structural diagram of an optical path system for detecting a vacuum degree of a vacuum switch of the present disclosure.

Reference numerals in the drawings are as follows: 100—block diagram of structural components; 102—optical path focusing unit; 104—plasma excitation unit; 106—signal control unit; 108—image collection unit; 110—vacuum degree detection unit; 112—result display unit; 200—top view 1 of an optical path; 202—touch screen; 300—top view 2 of the optical path; 302—laser reflector and mounting seat; 304—first long-wave-pass dichroscope and mounting seat; 306—concave lens and mounting seat; 308—convex lens and mounting seat; 310—second long-wave-pass dichroscope and mounting seat; 312—short-wave-pass filter and mounting seat; 314—micro lens; 316—large-bandwidth reflector and mounting seat; 318—high-precision stepping platform driver; 320—long-focal-length focusing lens and mounting seat; 322—high-precision stepping platform; 324—intensified charge coupled device (ICCD) camera; 326—stepping platform controller and power supply; 328—30$mj$ active electro-optic Q-switched nanosecond pulsed laser device; 330—touch screen driver; 332—ICC camera power supply adapter; 334—24V-to-5V transformer; 336—visible laser device switch; 338—visible laser device; 340—STM32 controller; wherein the first long-wave-pass dichroscope 304 is a dichroscope, and the second long-wave-pass dichroscope 310 is a dichroscope with a hole in the middle.

The present disclosure is further explained below in combination with the drawings and the embodiments.

DETAILED DESCRIPTION

Specific embodiments of the present disclosure will be described in more detail below with reference to the drawings. Although specific embodiments of the present disclosure are shown in the drawings, it should be understood that the present disclosure can be implemented in various forms and should not be limited by the embodiments set forth herein. On the contrary, these embodiments are provided to enable a more thorough understanding of the present disclosure and to fully deliver the scope of the present disclosure to those skilled in the art.

It should be noted that certain vocabularies are used in the description and claims to indicate specific components. Those skilled in the art should understand that technicians may use different terms to indicate the same component. This specification and claims do not use differences in terms as a way to distinguish components, but use differences in functions of components as a distinguishing criterion. If "comprise" or "include" mentioned in the entire specification and claims is an open term, it should be interpreted as "including but not limited to". The following description of the specification is a preferred implementation mode for implementing the present disclosure. However, the description is based on the general principles of the specification and is not intended to limit the scope of the present disclosure. The protection scope of the present disclosure should be based on those defined by the appended claims.

In order to facilitate the understanding of the embodiments of the present disclosure, specific embodiments will be used as examples for further explanation and description in conjunction with the drawings, and the respective drawings do not constitute a limitation to the embodiments of the present disclosure.

As shown in FIG. 1, an optical path system for detecting a vacuum degree of a vacuum switch includes: an optical path focusing unit 102 used for focusing pulsed laser on a shielding case of a vacuum switch to be detected and completing optical path focusing for a plasma excitation unit 104 and an image collection unit 108; the plasma excitation unit 104 used for exciting a laser plasma on the shielding case of the vacuum switch to be detected; the image collection unit 108 which collects an optical path focusing image and a laser plasma image; a vacuum degree detection unit 110 used for processing the collected laser plasma image, extracting characteristic parameters of the laser plasma, and obtaining, according to a pre-obtained relation between the characteristic parameters and a vacuum degree, the vacuum degree of the vacuum switch to be detected; a display and input unit used for displaying the optical path focusing image, the laser plasma image, and a vacuum detection result and inputting system parameters and a control signal; and a signal control unit 106 used for controlling optical path focusing and the excitation of the laser plasma. High-energy nanosecond pulsed laser is used to excite the laser plasma on the shielding case of the vacuum switch to be detected; a gated weak signal detector is used to collect laser plasma image information along a laser incident direction; the characteristic parameters of the laser plasma are extracted; and the vacuum degree of the vacuum switch to be detected is obtained according to the pre-obtained relation between the characteristic parameters and the vacuum degree. By adopting a vacuum switch vacuum detection technology based on a laser-induced plasma technology, remote contactless online monitoring for the vacuum switch can be realized; a limit of detection may reach 10-4 Pa, without changing the structure of the existing vacuum switch.

In an embodiment, the optical path focusing unit 102 is used for focusing the pulsed laser on the shielding case of the vacuum switch to be detected and completing the optical path focusing of the plasma excitation unit 104 and the image collection unit 108.

The plasma excitation unit 104 is used for exciting the laser plasma on the shielding case of the vacuum switch to be detected.

The image collection unit 108 is used for collecting the optical path focusing image and the laser plasma image.

The vacuum degree detection unit 110 is used for processing the collected laser plasma image, extracting the characteristic parameters of the plasma, and obtaining, according to the pre-obtained relation between the characteristic parameters and the vacuum degree, the vacuum degree of the vacuum switch to be detected.

The display and input unit integrates a display function and an input function and displays the optical path focusing image, the laser plasma image, and the vacuum detection result and inputs the system parameters and the control signal.

The signal control unit 106 is used for controlling the optical path focusing and the excitation of the laser plasma.

The display and input unit inputs the control signal according to the definition of the focusing image; the signal control unit 106 completes the optical path focusing according to the input signal; the plasma excitation unit 104 generates the high-energy pulsed laser to bombard the shielding case of the vacuum switch to be detected to excite the laser plasma, and meanwhile sends a signal to trigger the image collection unit 108 to collect the plasma image; the vacuum degree detection unit 110 processes the collected plasma image, extracts the characteristic parameters of the plasma, and obtains, according to the pre-obtained relation between the characteristic parameters and the vacuum degree, the vacuum degree of the vacuum switch to be detected; and the display and input unit displays a vacuum degree detection result.

In an embodiment, an excitation optical path of the plasma is: a high-energy nanosecond pulsed laser device-a laser reflector-a first long-wave-pass dichroscope-a plano-concave lens-a plano-convex lens-a second long-wave-pass dichroscope-a large-bandwidth reflector-a focusing lens—the shielding case of the vacuum switch; an image collection optical path is: the shielding case of the vacuum switch—the focusing lens—the large-bandwidth reflector—the second long-wave-pass dichroscope-a short-pass filter-a micro lens-a gated weak signal detector; the common optical path parts of the plasma excitation unit 104 and the image collection unit 108 are: the shielding case of the vacuum switch—the focusing lens—the large-bandwidth reflector—the second long-wave-pass dichroscope; the first long-wave-pass dichroscope is a conventional long-wave-pass dichroscope; and the second long-wave-pass dichroscope is a long-wave-pass dichroscope with a hole in the middle.

In an embodiment, the optical path focusing unit 102 includes a visible laser device, a high-precision stepping platform, and the first long-wave-pass dichroscope; visible laser spots are used to guide optical paths to be focused; the visible laser is reflected by the dichroscope to enter the excitation optical path of the plasma and irradiates a pulsed laser bombardment part on the shielding case of the vacuum switch to be detected; after the visible laser is collected by the image collection unit 108, a light spot image is displayed on the display and input unit; the signal control unit 106 adjusts the position of the focusing lens with a stepping precision of 50 μm to realize the optical path focusing; the plasma excitation unit 104 includes an active electro-optic Q-switched nanosecond pulsed laser device, a laser reflector, a beam expanding system consisting of a concave lens and a convex lens, a large-bandwidth reflector and a focusing lens; the beam expanding system expands pulsed laser spots before focusing to reduce the sizes of the focused light spots and increase the power density of the pulsed laser; the nanosecond pulsed laser device generates nanosecond pulsed laser according to the control signal; the nanosecond pulsed laser bombards the shielding case of the vacuum switch to be detected after being reflected by the laser reflector, expanded by the beam expanding system, reflected by the large-bandwidth reflector and focused by the focusing lens, thereby generating the laser plasma; a Q-out signal output by the pulsed laser device triggers the gated weak signal detector of the image collection unit 108 to collect the laser plasma image; the image collection unit 108 includes the gated weak signal detector, the micro lens, the low-pass filter, and the second long-wave-pass dichroscope; the gated weak signal detector is used as an image collection element; one low-pass filter is in front of the gated weak signal detector to protect the gated weak signal detector; the micro lens performs focusing at a pulsed laser focusing point; a duration between the collection of the plasma image and the excitation of the laser plasma is controlled by an internal response delay of the gated weak signal detector; the plasma laser returns by the focusing lens and is imaged on the gated weak signal detector via the reflector, the second long-wave-pass dichroscope, and the low-pass filter; the vacuum degree detection unit 110 includes an STM32 controller with built-in plasma image processing program and vacuum degree information extraction program, processes the plasma image collected by the image collection unit 108, extracts the characteristic parameters of the plasma, and obtains, according to the pre-obtained relation between the characteristic parameters and the vacuum degree, the vacuum degree of the vacuum switch to be detected.

The signal control unit 106 includes an STM32 controller with a built-in control signal input/output program, receives the control signal of the display and input unit, and outputs a forward or backward signal to control the stepping platform carrying the focusing lens to move backwards and forwards, so as to change the focusing position of the pulsed laser and realize the optical path focusing; the output signal controls the visible laser device and the active electro-optic Q-switched nanosecond pulsed laser device; the display and input unit includes a touch display screen integrating functions of inputting the control signal, setting parameters and displaying the collected image, including: inputting a stepping control signal of the stepping platform, setting parameters of the gated weak signal detector, measuring and controlling the vacuum degree, and displaying the focusing image, the plasma image and the detection result; the high-energy nanosecond pulsed laser is used to excite the laser plasma on the shielding case of the vacuum switch to be detected; the gated weak signal detector is then used to collect the laser plasma image along a laser incident direction, extract the characteristic parameters of the plasma, and obtains, according to the pre-obtained relation between the characteristic parameters of the plasma and the vacuum degree, the vacuum degree of the vacuum switch to be detected; according to actual working conditions of the detection of the vacuum degree of the vacuum switch, the visible laser is introduced to form visible light spots on the shielding case of the vacuum switch to be detected; the image collection unit 108 collects a light spot image; and a control signal is input to the display and input unit according to the definition of the light spot image to control the focusing lens carried on the stepping platform to perform high-precision stepping forwards or backwards, so that the position of the focusing lens is changed to realize the optical path focusing. After the optical path focusing is completed, the signal control unit 106 outputs a signal to the active electro-optic Q-switched nanosecond pulsed laser device of the plasma excitation unit 104; the nanosecond pulsed laser device outputs the Q-out signal to the gated weak signal detector of the image collection unit 108 while outputting the nanosecond pulsed laser, and the laser plasma image is collected after a preset response delay. The vacuum degree detection unit 110 processes the laser plasma image, extracts the characteristic parameters of the plasma, and obtains, according to the pre-obtained relation between the characteristic parameters and the vacuum degree, the vacuum degree of the vacuum switch to be detected; and the display and input unit displays the vacuum degree detection result. In addition, the micro lens of the image collection unit 108 performs focusing at the focusing position of the pulsed laser before the detection.

In an embodiment, the excitation optical path is: the high-energy nanosecond pulsed laser device—the laser reflector—the first long-wave-pass dichroscope—the plano-concave lens—the plano-convex lens—the second long-wave-pass dichroscope—the large-bandwidth reflector—the focusing lens—the shielding case of the vacuum switch; the image collection optical path is: the shielding case of the vacuum switch—the focusing lens—the large-bandwidth reflector—the second long-wave-pass dichroscope—the short-pass filter—the micro lens—the gated weak signal detector; the common parts of the plasma excitation optical path and the image collection optical path are: the shielding case of the vacuum switch—the focusing lens—the large-bandwidth reflector—the second long-wave-pass dichroscope; the first long-wave-pass dichroscope is a conventional dichroscope; and the second long-wave-pass dichroscope is a dichroscope with a hole in the middle. The high-energy pulsed laser is used to excite the plasma on the shielding case of the vacuum switch; the plasma image information is collected along the pulsed laser incident direction; the plasma image is analyzed to obtain the characteristic parameters of the plasma; and the vacuum degree of the vacuum switch to be detected is obtained according to the pre-obtained relation between the characteristic parameters and the vacuum degree.

Referring to FIG. 1 which is a block diagram of structural components of a preferred embodiment of the present disclosure, the structural components mainly include: the optical path focusing unit 102, the plasma excitation unit 104, the image collection unit 108, the vacuum degree detection unit 110, the signal control unit 106, and the display and input unit. The optical path focusing unit 102 focuses the pulsed laser on the shielding case of the vacuum switch to be detected to realize focusing of the plasma excitation optical path and the image collection optical path; the plasma excitation unit 104 is used for emitting high-energy pulsed laser to excite a plasma on the shielding case of the vacuum switch to be detected; the image collection unit 108 is used for controlling a collection time sequence of a laser plasma image and the collection of the laser plasma image; the vacuum degree detection unit 110 is used for processing the collected plasma image, extracting the characteristic parameters of the plasma, and obtaining, according to the pre-obtained relation between the characteristic parameters and the vacuum degree, the vacuum degree of the vacuum switch to be detected; the display and input unit is used for the functions of inputting the control signal, setting the parameters, and displaying the collected image, including: inputting stepping control signal of the stepping platform, setting parameters of the gated weak signal detector, measuring and controlling the vacuum degree, and displaying the focusing image, the plasma image and the detection result.

Figure 2:
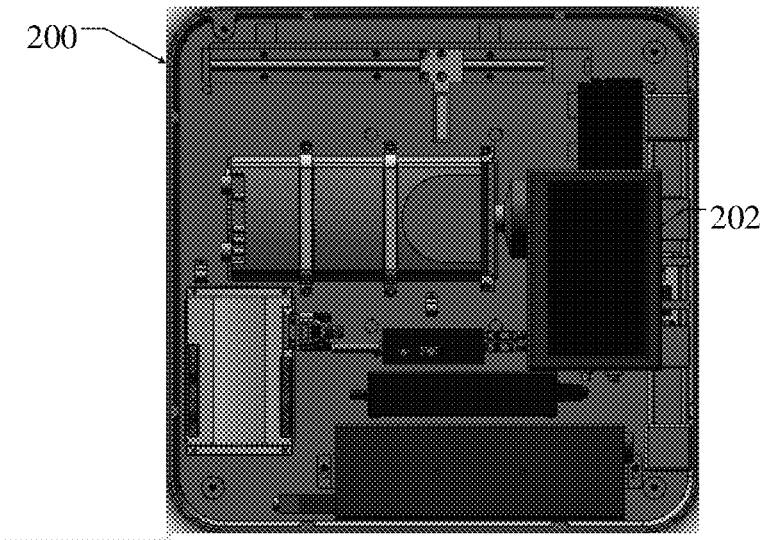
FIG. 2 is a top view of an optical path in an embodiment of an optical path system for detecting a vacuum degree of a vacuum switch of the present disclosure.

Referring to FIG. 2 which is a top view 1 of an optical path in a preferred embodiment of the present disclosure, a touch screen 202 integrates inputting of the signal control unit, parameter setting of the image collection unit, image displaying, and detection result displaying.

Figure 3:
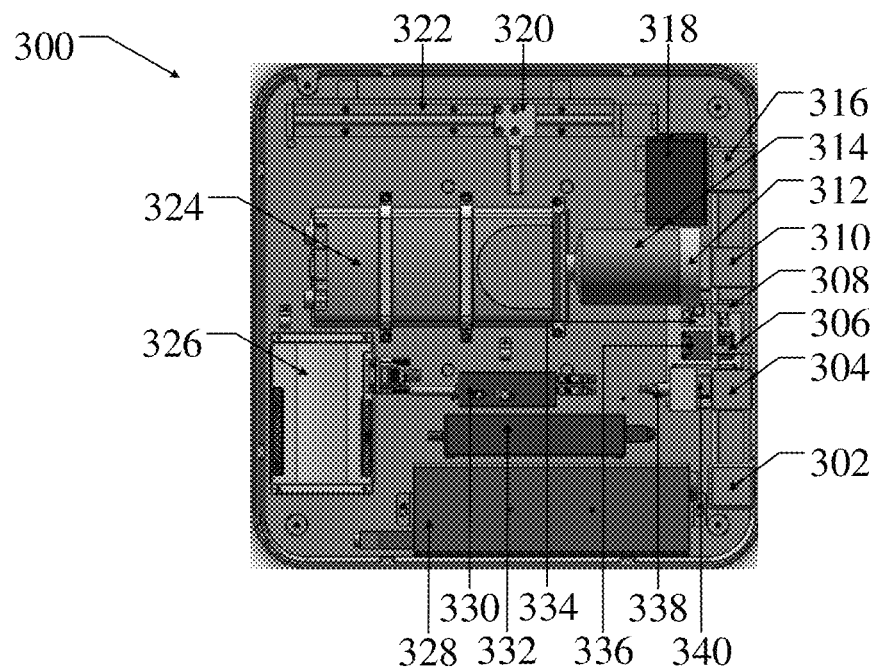
FIG. 3 is a top view of an optical path in an embodiment of an optical path system for detecting a vacuum degree of a vacuum switch of the present disclosure.

Referring to FIG. 3 which is a top view 2 of an optical path in a preferred embodiment of the present disclosure, it should be noted that an ICCD camera serves as the gated weak signal detector in the embodiment; the first long-wave-pass dichroscope is a conventional dichroscope; and the second long-wave-pass dichroscope is a dichroscope with a hole in the middle. The visible laser device 338 generates continuous red visible laser that passes through the first long-wave-pass dichroscope 304, the concave lens 306, the convex lens 308, the second long-wave-pass dichroscope 310, the reflector 316, and the focusing lens 320 in sequence, to form visible light spots are formed on the shielding case of the vacuum switch to be detected; the visible light spots pass through the focusing lens 320, the reflector 316, the second long-wave-pass dichroscope 310 with a hole, the short-wave-pass filter 312, and the micro lens 314 in sequence to be imaged by the ICCD camera 324; the touch screen 202 displays the collected visible light spot image; forward and backward stepping signals are input to the touch screen 202 according to the definition of the light spot image; a high-precision stepping platform controller 326 and a high-precision stepping platform driver 318 control the stepping platform 322 to do high-precision stepping motion; and focusing lens and mounting seat 320 are carried on the stepping platform to step with the stepping platform, so that the focusing position of the pulsed laser is changed to realize the optical path focusing. After the focusing is completed, the touch screen 320 and an STM32 controller 340 output signals to trigger the pulsed laser device 328 to output the pulsed laser; the pulsed laser passes through the laser reflector 302, the first long-wave-pass dichroscope 304, the concave lens 306, the convex lens 308, the second long-wave-pass dichroscope 310, and the reflector 316 in sequence, and is focused by the focusing lens 320 to bombard the shielding case of the vacuum switch to be detected, so as to generate the laser plasma; the pulsed laser device 328 outputs the Q-out signal to trigger the ICCD camera 324 to collect the laser plasma image after the predetermined response delay; the STM32 controller 340 processes the collected laser plasma image, extracts the characteristic parameters of the laser plasma, obtains, according to the pre-obtained relation between the characteristic parameters and the vacuum degree, the vacuum degree of the vacuum switch to be detected, and displays the detection result on the touch screen 202. In addition, the micro lens of the image collection unit performs focusing at the focusing position of the pulsed laser before the detection. The common optical path parts of the plasma excitation unit and the image collection unit are: the shielding case of the vacuum switch to be detected—the focusing lens 320—the large-bandwidth reflector 316—the second long-wave-pass dichroscope 310.

Figure 4:
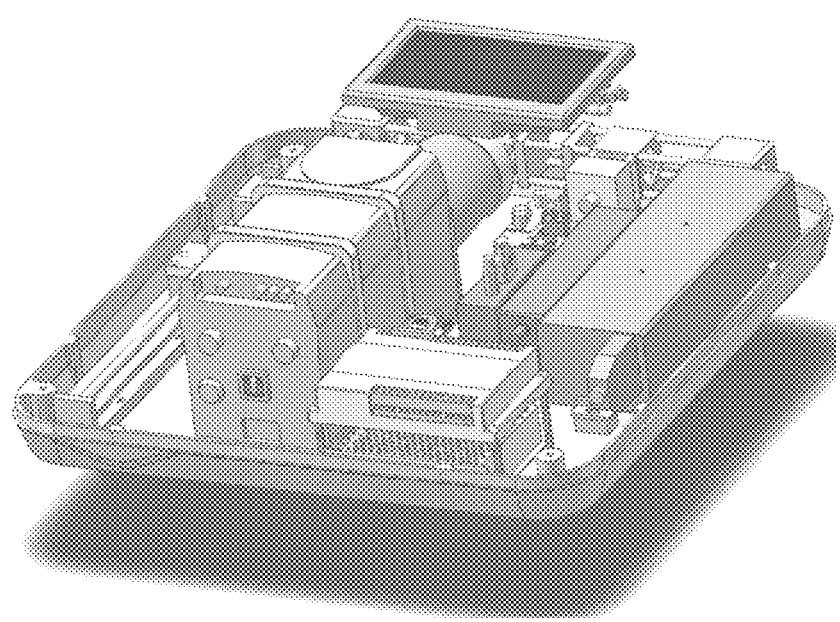
FIG. 4 is a schematic structural diagram of an optical path system for detecting a vacuum degree of a vacuum switch of the present disclosure.

Referring to FIG. 4, a structural diagram of an overall optical path in a preferred embodiment of the present disclosure is illustrated.

Figure 5:
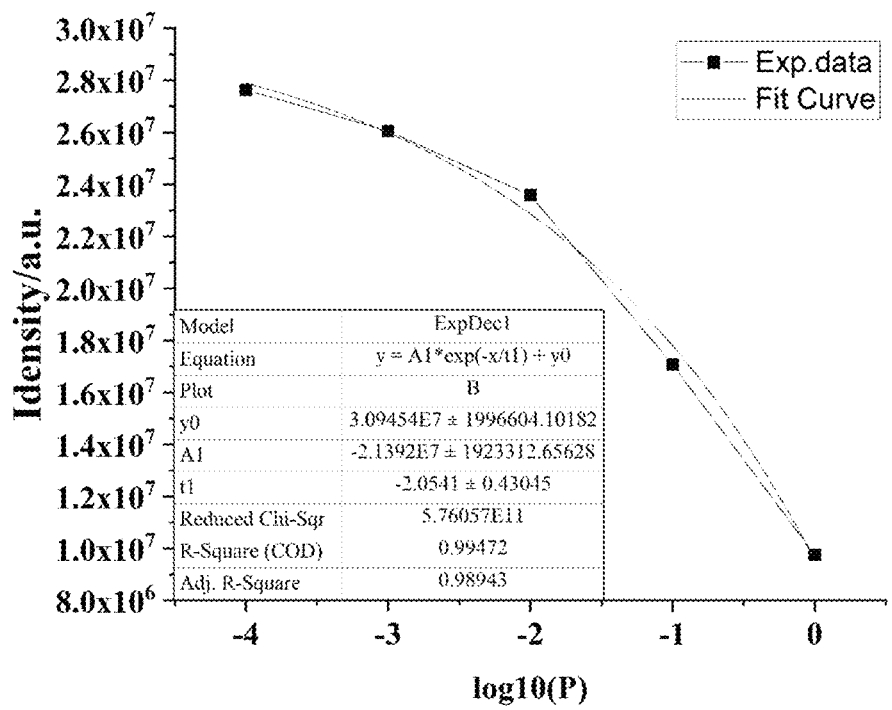
FIG. 5 is a schematic diagram of a relation between characteristic parameters of a plasma and a vacuum degree of the optical path system for detecting a vacuum degree of a vacuum switch of the present disclosure.

A working method of the preferred embodiment of the present disclosure is as follows: before the vacuum degree of the vacuum switch is detected, the relation between the characteristic parameters of the laser plasma and the vacuum degree is pre-obtained, and the relation between the characteristic parameters and the vacuum degree is input into the STM32 controller 340 in the form of a program. Referring to FIG. 5 which is about the relation between the characteristic parameters of the laser plasma and the vacuum degree obtained in the embodiment, in the figure, a black point plot shows experimental data, a red curve is a fitted curve, it is determined that a coefficient R-Square reaches 0.99472, which indicates an extremely high fitting degree. Various parameter conditions of the embodiment are as follows: the energy of the active electro-optic Q-switched nanosecond pulsed laser is 30 mJ; a pulse width is 5 ns; the Q-out signal is output 35 ns before the output of the pulsed laser; and the ICCD camera has a response delay of 500 ns, an exposure gate width of 100 ns, and a gain of 0.

Figure 6:
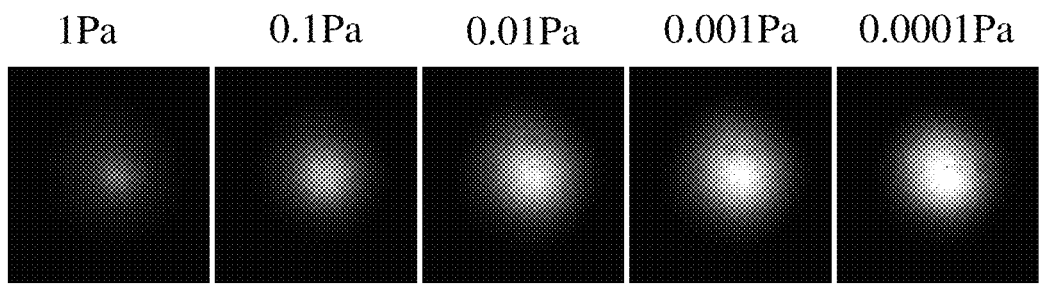
FIG. 6 is a schematic diagram of a laser plasma image under various air pressures of an optical path system for detecting a vacuum degree of a vacuum switch of the present disclosure.

At the beginning of the vacuum degree detection for the vacuum switch, the ICCD camera 324, the visible laser device 338, the high-energy pulsed laser device 328, the high-precision stepping platform 322 with the precision of 50 μm, and the touch screen 202 are turned on; the visible laser generated by the visible laser device 338 passes through the first long-wave-pass dichroscope 304, the plano-concave lens 306 with a focal length of −15 mm, the plano-convex lens 308 with a focal length of 38.1 mm, the second long-wave-pass dichroscope 310 with a round hole in the center (the diameter of the round hole is 2 mm), the large-bandwidth reflector 316, and the plano-convex focusing lens 320 with a focal length of 500 mm in sequence to form the visible light spots on the shielding case of the vacuum switch to be detected; the visible light spots pass through the plano-convex focusing lens 320, the reflector 316, the second long-wave-pass dichroscope 310 with a hole, the short-wave-pass filter 312, and the micro lens 314 in sequence to be imaged by the ICCD camera 324, and the touch screen 202 displays the collected visible light spot image; a forward or backward stepping signal is input to the touch screen 202 according to the definition of the light spot image; the stepping platform controller 326 and the driver 318 control the stepping platform 322 to do forward or backward stepping motion with the precision of 50 μm; the plano-convex focusing lens with the focal length of 500 mm and mounting seat 320 are carried on the stepping platform 322 to step with the stepping platform, so that the position of a pulsed laser focusing point is changed; and the optical path focusing is completed when the light spot image has the highest definition. It should be noted that the micro lens performs focusing at the focusing point of the focusing lens 320 before the detection; after the focusing is completed, a test start signal is input to the touch screen 202; the STM32 controller 340 outputs a signal to trigger the pulsed laser device 328, and the pulsed laser device 328 outputs two signals; one signal is output to a laser head which outputs pulsed laser with energy of 30 mJ and a pulsed width of 5 ns; the pulsed laser passes through the laser reflector 302, the first long-wave-pass dichroscope 304, the plano-concave lens 306 with the focal length of −15 mm, the plano-convex lens 308 with the focal length of 38.1 mm, the second long-wave-pass dichroscope 310 with the round hole in the center (the diameter of the round hole is 2 mm), and the large-bandwidth reflector 316, and is focused by the plano-convex focusing lens 320 with the focal length of 500 mm to bombard the shielding case of the vacuum switch to be detected, so as to generate the laser plasma. The other signal is used as the Q-out signal output to the ICCD camera 324; an output interval between the Q-out signal and the pulsed laser is 35 ns; the ICCD camera collects the laser plasma image after the response delay of 500 ns; the ICCD camera 324 has an exposure gate width of 100 ns and a gain of 0; and the collected laser plasma image is processed by the STM32 controller 340. In the embodiment, vacuum switches with vacuum degrees of 1 Pa, 0.1 Pa, 0.01 Pa, 0.001 Pa, and 0.0001 Pa are used as vacuum switches to be detected. The collected laser plasma images are as shown in FIG. 6. It should be noted that an image collected by the ICCD camera is a 16-bit gray-scale image. FIG. 6 shows a normalized gray-scale processing result. Vacuum degree detection results are respectively 0.9976 Pa, 0.1193 Pa, 0.0065 Pa, 0.00064856 Pa, and 0.0001387 Pa, and the degrees of precision are respectively −0.2374%, 19.3%, −35.0%, −35.14%, and 38.7%.

Although the embodiments of the present disclosure are described above in combination with the drawings, the present disclosure is not limited to the above specific embodiments and application fields. The above specific embodiments are only illustrative and instructive, but not restrictive. Under the enlightenment of this specification and without departing from the scope of protection of the claims of the present disclosure, those of ordinary skill in the art can also make many forms, which all fall within the protection of the present disclosure.

The invention claimed is:

1. An optical path system for detecting a vacuum degree of a vacuum switch, comprising:
    a plasma excitation unit, which excites pulsed laser along an excitation optical path to bombard a shielding case of a vacuum switch to be detected, so as to generate a laser plasma;
    an optical path focusing unit, which focuses the excitation optical path and a collection optical path to focus the pulsed laser to the shielding case of the vacuum switch to be detected, and comprises a visible laser device for generating visible light and an adjustment device for adjusting the excitation optical path, wherein the visible light forms visible light spots on the shielding case of the vacuum switch to be detected along a visible optical path, the visible optical path at least partially overlaps the excitation optical path, and the collection optical path at least partially overlaps the visible optical path;
    an image collection unit, which collects a laser plasma image and a visible light spot focusing image, and comprises a gated detector for collecting the visible light spot image and the laser plasma image via the collection optical path;
    a vacuum degree detection unit, which is connected with the image collection unit to process the laser plasma image and extract characteristic parameters, and comprises a processor for obtaining, according to a relation between the characteristic parameters and a vacuum degree, the vacuum degree of the vacuum switch to be detected; and
    the excitation optical path comprises a laser reflector for receiving the pulsed laser, a first long-wave-pass dichroscope, a plano-concave lens, a plano-convex lens, a second long-wave-pass dichroscope, a reflector, and a focusing lens adjacent to the shielding case of the vacuum switch to be detected, which are connected in sequence.

2. The optical path system for detecting the vacuum degree of the vacuum switch according to claim 1, wherein the second long-wave-pass dichroscope is a dichroscope with a hole in the middle.

3. The optical path system for detecting the vacuum degree of the vacuum switch according to claim 1, wherein the visible optical path comprises a first long-wave-pass dichroscope, a concave lens, a convex lens, a second long-wave-pass dichroscope, a reflector, and a focusing lens adjacent to the shielding case of the vacuum switch to be detected, which are connected in sequence.

4. The optical path system for detecting the vacuum degree of the vacuum switch according to claim 3, wherein the collection optical path comprises a focusing lens adjacent to the shielding case of the vacuum switch to be detected, a reflector, a second long-wave-pass dichroscope, a low-pass filter, and a micro lens adjacent to the gated detector, which are connected in sequence.

5. The optical path system for detecting the vacuum degree of the vacuum switch according to claim 1, further comprising:
    a display and input unit, which is connected with the image collection unit and the vacuum degree detection unit to display the laser plasma image and the visible light spot image, and the vacuum degree, and is provided with a touch display screen for inputting system parameters and a control signal; and
    a signal control unit, which is connected with the optical path focusing unit, the plasma excitation unit, and the display and input unit to control optical path focusing and excitation of the laser plasma.

6. The optical path system for detecting the vacuum degree of the vacuum switch according to claim 5, wherein the display and input unit is the touch display screen.

7. The optical path system for detecting the vacuum degree of the vacuum switch according to claim 4, wherein the micro lens performs focusing at a pulsed laser focusing point; and a duration between the collection of the plasma image and the excitation of the laser plasma is controlled by an internal response delay of the gated detector.

8. The optical path system for detecting the vacuum degree of the vacuum switch according to claim 1, wherein the plasma excitation unit comprises a nanosecond pulsed laser and a beam expanding system; and a Q-out signal output by the pulsed laser triggers the gated detector to collect the laser plasma image.

9. A detection method using the optical path system for detecting the vacuum degree of the vacuum switch according to claim 1, comprising the following steps:
    generating, by a visible laser device, visible light, and forming, by the visible light, visible light spots on a shielding case of a vacuum switch to be detected along a visible optical path;
    exciting, by a plasma excitation unit, pulsed laser along an excitation optical path to bombard the shielding case of the vacuum switch to be detected, so as to generate a laser plasma;
    collecting, by an image collection unit, a laser plasma image and a visible light spot focusing image, focusing, by an optical path focusing unit, the excitation optical path and a collection optical path to focus the pulsed laser on the shielding case of the vacuum switch to be detected, wherein an adjustment device adjusts the excitation optical path; and processing, by a vacuum degree detection unit, the laser plasma image, extracting characteristic parameters, and obtaining, on the basis of a relation between the characteristic parameters and a vacuum degree, the vacuum degree of the vacuum switch to be detected.

10. The method of claim 9, wherein the excitation optical path comprises the laser reflector for receiving the pulsed laser, the first long-wave-pass dichroscope, the plano-concave lens, the plano-convex lens, the second long-wave-pass dichroscope, the reflector, and the focusing lens adjacent to the shielding case of the vacuum switch to be detected, which are connected in sequence.

11. The method of claim 10, wherein the second long-wave-pass dichroscope is a dichroscope with a hole in the middle.

12. The method of claim 10, wherein the visible optical path comprises the first long-wave-pass dichroscope, the concave lens, the convex lens, the second long-wave-pass dichroscope, the reflector, and the focusing lens adjacent to the shielding case of the vacuum switch to be detected, which are connected in sequence.

13. The method of claim 12, wherein the collection optical path comprises the focusing lens adjacent to the shielding case of the vacuum switch to be detected, the reflector, the second long-wave-pass dichroscope, the low-pass filter, and the micro lens adjacent to the gated detector, which are connected in sequence.

14. The method of claim 9, further comprising:

the display and input unit, which is connected with the image collection unit and the vacuum degree detection unit to display the laser plasma image and the visible light spot image, and the vacuum degree, and is provided with a touch display screen for inputting system parameters and the control signal; and the signal control unit, which is connected with the optical path focusing unit, the plasma excitation unit, and the display and input unit to control optical path focusing and excitation of the laser plasma.

15. The method of claim 14, wherein the display and input unit is the touch display screen.

16. The method of claim 13, wherein the micro lens performs focusing at the pulsed laser focusing point; and the duration between the collection of the plasma image and the excitation of the laser plasma is controlled by the internal response delay of the gated detector.

17. The method of claim 9, wherein the plasma excitation unit comprises the nanosecond pulsed laser and the beam expanding system; and the Q-out signal output by the pulsed laser triggers the gated detector to collect the laser plasma image.

* * * * *